Aug. 4, 1964 R. C. BARTON 3,143,213
MATERIAL SEPARATING DEVICE
Filed May 8, 1961 2 Sheets-Sheet 1

Inventor
Roscoe C. Barton
By Carl C. Batz
Attorney

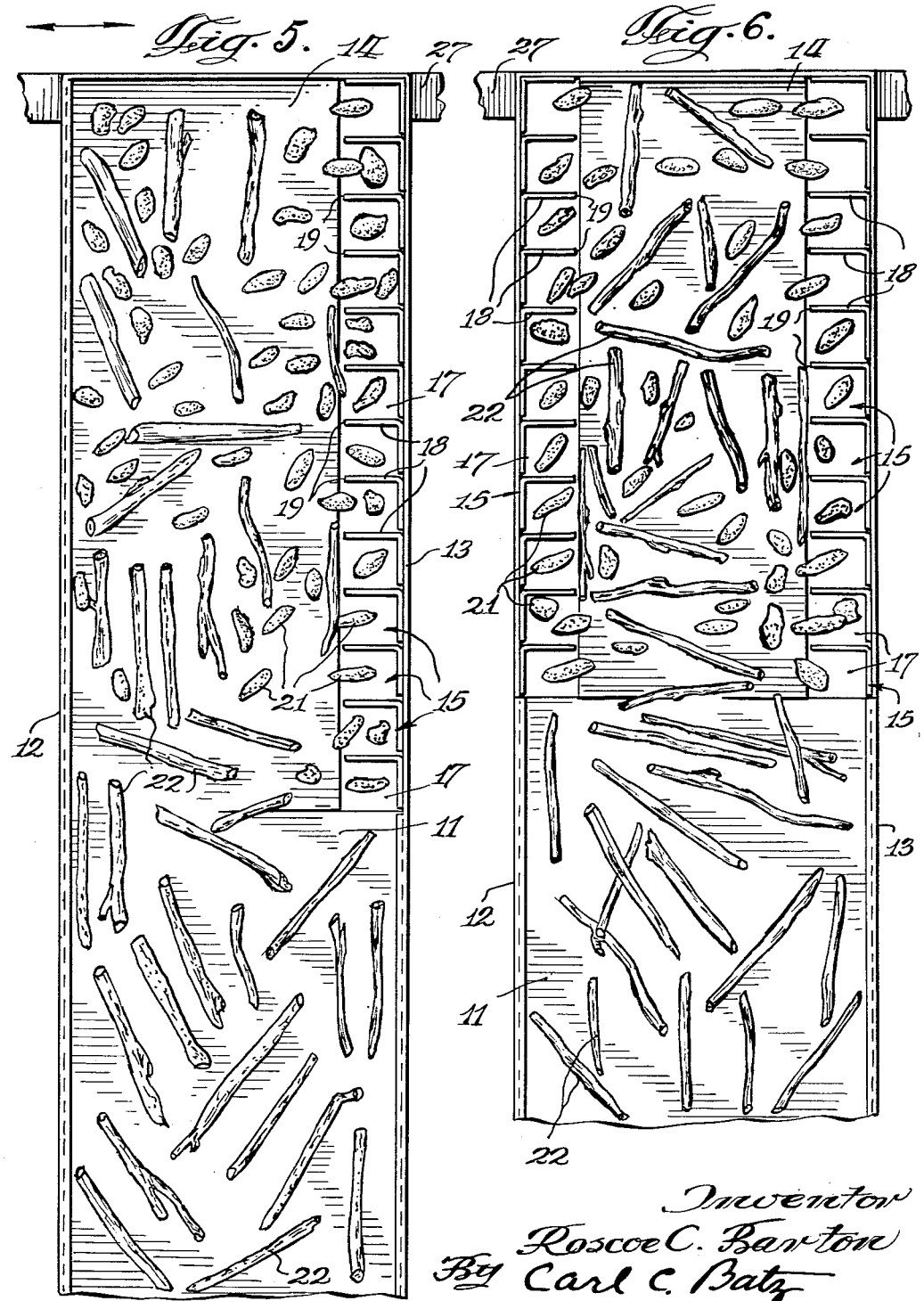

Patent 3,143,213

3,143,213
MATERIAL SEPARATING DEVICE
Roscoe C. Barton, New Orleans, La., assignor to Armour and Company, Chicago, Ill., a corporation of Delaware
Filed May 8, 1961, Ser. No. 108,619
6 Claims. (Cl. 209—93)

This invention relates to a device for separating a mixture of materials and it particularly relates to a device for separating a mixture of materials of varying shapes and sizes into at least two portions.

There are many occasions requiring the separation of a mixture of materials into desired portions. Frequently, a separation of materials is accomplished by introducing the mixture of materials to a screen or to a series of screens having varying mesh sizes. An example of an occasion requiring such a separation is in cleaning cottonseed, wherein it is necessary to separate cottonseed having approximately the shape of a sphere or spheroid, from foreign matter, particularly elongated objects, such as sticks. In the prior practice, when the mixed materials are introduced on a screen, the cottonseed passes through and the sticks remain on the screen. However, it has been a problem that sticks become lodged in or cover the screen openings. As a result, the separation is progressively less efficient, until it becomes necessary to remove the sticks from the screen openings.

It is therefore an object of this invention to provide an improved device for efficiently separating mixed materials into desired portions.

It is a further object to provide a separating device which does not require frequent cleaning.

It is also an object to provide a separating device which is adapted to separate a mixture of materials having varying shapes or sizes into at least two portions.

Another object is to provide a separating device which may be easily constructed.

It is still further object to provide a separating device which is adapted to be used on a continuous production line basis.

It is still another object to provide apparatus for utilizing an improved separating device.

Further objects and purposes of the present invention will become obvious as the specification proceeds.

The accompanying drawings illustrate an embodiment of the present invention, wherein:

FIG. 5 is an enlarged plan view of the separating device illustrated in FIG. 2.

FIG. 6 is an alternate embodiment of the separating device illustrated in FIG. 5.

Figure 4:
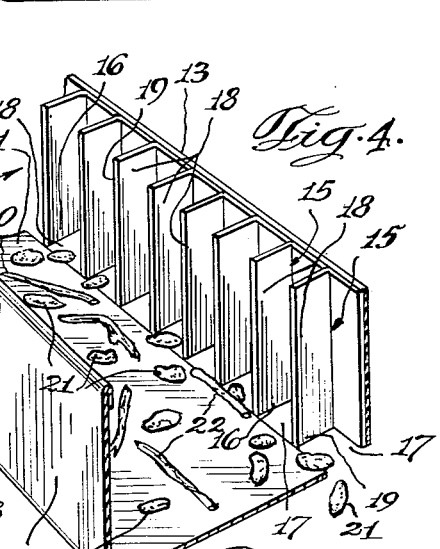
FIG. 4 is an enlarged, broken perspective view of the improved separating device illustrated in FIG. 2.

Referring particularly to FIG. 4, the device for separating materials, generally 10, comprises a bottom 11, a first side 12, and a second side 13 which together form the interior 14 of device 10, and a plurality of compartments, generally 15, which are positioned along at least one side, as side 13, compartments 15 having entrance openings 16 and exit openings 17, both openings 16 and 17 being adjacent to bottom 11, entrance openings 16 being in communication with interior 14.

The compartments 15 are formed by side 13 and a series of walls 18, which are fastened together in spaced relationship by a side, as side 13. Side 13 is fastened to bottom 11 in such a way that edges 19 of walls 18 are in close proximity to edge 20 of bottom 11. Walls 18 and bottom 11 form entrance openings 16 and walls 18, side 13 and bottom 11 form exit openings 17, the plane of entrance openings 16 being substantially transverse to the plane of exit openings 17. Referring to the embodiment of the separating device 10 shown in FIG. 5, it is preferred that compartments 15 not extend the entire length of side 13, which simplifies the collection of cottonseed 21 and foreign matter 22. Referring to FIG. 6, an alternate embodiment of the separating device 10 has compartments 15 on both sides 12 and 13, making the separation more rapid and more efficient than when compartments 15 are on only one side.

Figure 2:
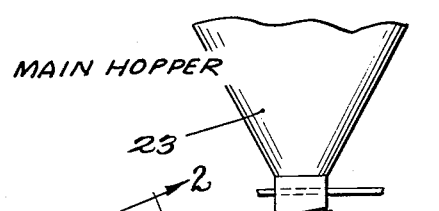
FIG. 2 is a side elevation view of apparatus utilizing the improved separating device of this invention.
Figure 2:
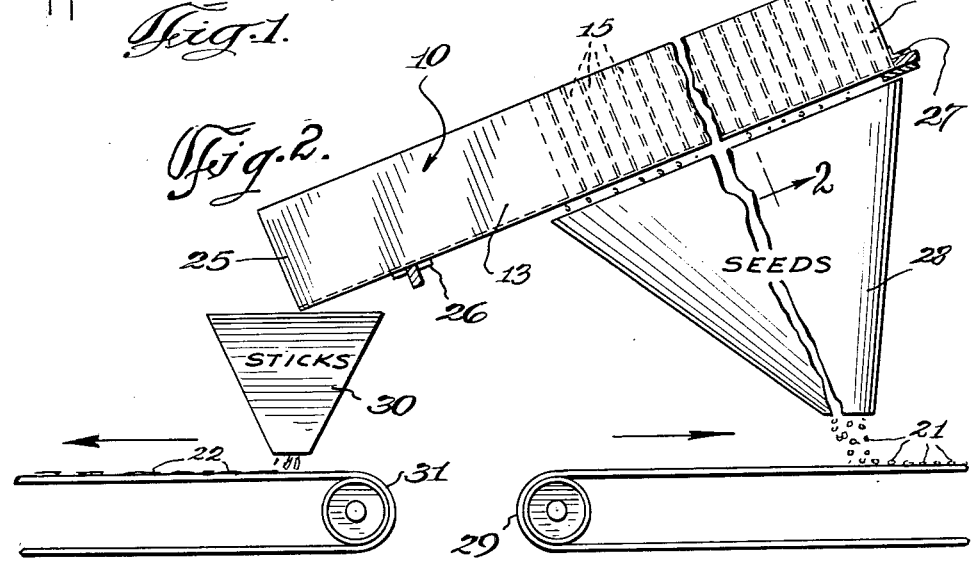
Figure 3:
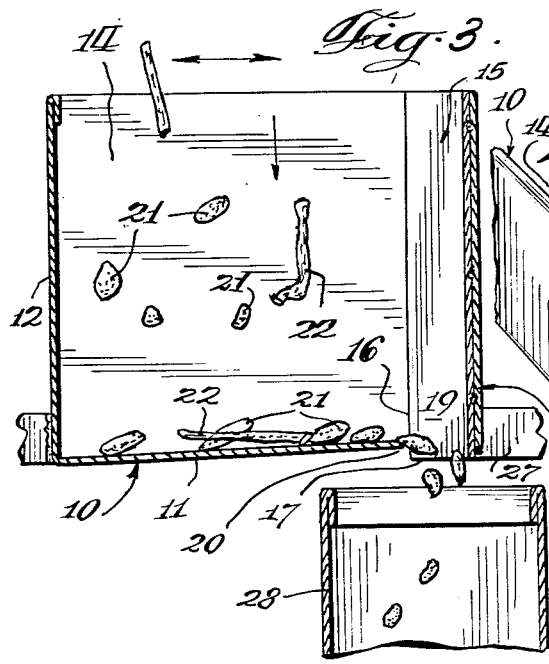
FIG. 3 is a section view of the improved separating device, taken along line 2—2 of FIG. 2.

In operation, mixed materials, as cottonseeds 21 and sticks 22, are placed in device 10, which then is vibrated or shaken by hand or by suitable mechanical means in the direction indicated by the arrows in FIGS. 2, 3 and 4, i.e., substantially transverse to the plane of sides 12 and 13. By such movement, cottonseeds 21 pass through both entrance and exit openings 16 and 17. Compartments 15 are of such dimensions that ordinarily only cottonseeds 21 pass through exit openings 17, whereas sticks 22 strike edges 19 of walls 18 and are prevented from entering entrance openings 16, or they strike walls 18 and side 13 and are prevented from passing through exit openings 17. Sticks 22 are therefore prevented from remaining with cottonseeds 21, and an efficient, improved, simplified separation of materials results.

My improved separating device 10 substantially eliminates a problem of foreign material blocking apertures in a separating device, and yet it performs an excellent separation of materials. Sticks 22 ordinarily do not block openings 16 or 17 and also, relatively few, if any, sticks 22 are of such dimensions that they fall through exit openings 17. Therefore, the present invention accomplishes all objects previously set out.

Figure 1:
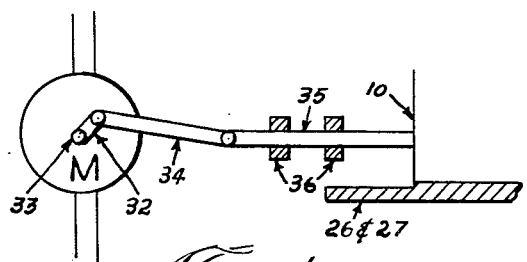
FIG. 1 is a schematic view showing a suitable mechanical vibrating device to vibrate the separating device.

Preferred apparatus utilizing the separating device 10 is shown in FIG. 2. Feeder or hopper 23 is filled with a mixture of materials such as cottonseeds 21 and sticks 22, the mixture being introduced to the higher end 24 of separating device 10. Separating device 10 is tilted at an acute angle with the ground, allowing materials 21 and 22 to flow downwards, towards the lower end 25 of device 10 by action of gravity. The separating device 10 is attached to suitable vibrating means and is vibrated in a direction substantially transverse to the flow of material along bottom 11, device 10 being slideably positioned on guides 26 and 27. FIG. 1 shows suitable vibrating means including a crank arm 32 keyed to the shaft of a motor 33, a connecting rod 34 pivotly mounted at one end to the crank arm 32, and a reciprocating shaft 35, slideably positioned in bearings 36, one end being pivotly mounted to the second end of the connecting rod 34, and the other end being secured to the separating device 10 which is slideably positioned on guides 26 and 27. As the motor rotates its shaft 33 at a desireable speed, the crank arm 32 causes the reciprocation of the shaft 35 and the separating device 10, by means of the connecting rod 34 being pivotly mounted to both the arm 32 and shaft 35. As cottonseeds 21 fall through exit openings 17, they are collected by collecting means 28, then are dropped on conveying means 29. The width of collection means 28 is at least equivalent to the distance of transverse travel of separating device 10 while it is being vibrated. Sticks and other foreign matter 22 are collected at lower end 25 of separating device 10 in collecting means 30. From collecting means 30, sticks and foreign material 22 are passed to suitable conveying means 31. By using this preferred apparatus, the separating device 10 is utilized effectively and efficiently on a continuous commercial scale.

While in the foregoing specification, there has been a detailed description of the improved device and apparatus for using the device for the purpose of illustrating a specific embodiment of my invention, it is understood that such details of structure may be varied widely by those skilled in the art, without departing from the spirit and scope of the invention.

I claim:

1. A device for separating materials, comprising a substantially unbroken bottom, a first side, and a second side, which together form the interior of said device, and a plurality of compartments positioned along at least one of said sides, said compartments having entrance and exit openings which are adjacent to said bottom, said entrance openings being in communication with said interior and the plane of said entrance openings being substantially transverse to the plane of said bottom and said exit openings.

2. A device for separating materials, comprising a substantially unbroken bottom, and two upstanding, opposed sides, said bottom and said sides forming the interior of said device, and a plurality of compartments positioned along at least one of said sides, said compartments having entrance and exit openings which are adjacent to said bottom, said entrance opening, being in communication with said interior and the plane of said entrance openings being substantially transverse to the plane of said bottom and said exit openings.

3. A device for separating materials, comprising an elongated substantially unbroken bottom, a first side and a second side, said sides being opposed to each other and at a substantially right angle to said bottom, said sides and said bottom forming the interior of said device, and a plurality of compartments positioned along at least one of said sides, said compartments having entrance openings and exit openings which are adjacent to said bottom, said entrance opening being in communication with said interior and the plane of said entrance openings being substantially transverse to the plane of said bottom and said exit openings, said compartments also having walls, which are transverse to said bottom and to said sides, said walls and said sides being adapted to prevent at least one of said materials from passing through said exit openings.

4. Apparatus for separating materials, comprising means for separating said materials, said means comprising a bottom, a first side and a second side, which together form the interior of said device, and a plurality of compartments positioned along at least one of said sides, said compartments having entrance and exit openings which are adjacent to said bottom, said entrance openings being in communication with said interior and the plane of said entrance openings being substantially transverse to the plane of said exit openings; means for feeding said materials to said separating means; means for vibrating said separating means in a direction transverse to said sides, said vibration causing at least one of said materials to pass through said exit openings; and means for collecting the separated portions of said materials.

5. Apparatus for separating materials, comprising means for separating said materials, said means including an elongated bottom, a first side and a second side, said sides being opposed to each other and at substantially right angles to said bottom, said sides and said bottom forming the interior of said device, and a plurality of compartments positioned along at least one of said sides, said compartments having entrance openings and exit openings which are adjacent to said bottom, said entrance openings being in communication with said interior and the plane of said entrance openings being substantially transverse to the plane of said exit openings, said compartments being adapted to allow at least one of said materials to pass through said exit openings and to prevent at least one of said materials from passing through said exit openings; means for introducing a mixture of said materials to said separating means; means for vibrating said separating means in a direction transverse to said sides, said vibration causing at least one of said materials to pass through said exit openings; and means for collecting the separated portions of said materials.

6. Apparatus for separating cottonseed from sticks, comprising means for separating said cottonseed from said sticks, said means comprising an elongated bottom, a first side and a second side, said sides being opposed to each other and at substantially right angles to said bottom, said sides and said bottom forming the interior of said device, and a plurality of compartments positioned along at least one of said sides, said compartments having entrance openings and exit openings which are adjacent to said bottom, said entrance openings being in communication with said interior and the plane of said entrance openings being substantially transverse to the plane of said exit openings, said compartments also having walls, said walls being adapted to prevent a portion of said sticks from passing through said entrance openings, and said walls and said side being adapted to prevent the remaining portion of said sticks from passing through said exit openings, said bottom of said device being positioned at an acute angle with the ground, whereby said separating means is provided with a higher end and a lower end; means for feeding the cotton seed and sticks to said higher end of said separating means; means for vibrating said separating means in a direction transverse to the sides of said device whereby said vibration causes said cottonseed to pass through said exit openings; and means for collecting said cottonseed and said sticks.

References Cited in the file of this patent

UNITED STATES PATENTS

| 1,138,245 | Parsons | May 4, 1915 |
| 1,531,803 | McNeal | Mar. 31, 1925 |
| 2,825,454 | Musgrave | Mar. 4, 1958 |

FOREIGN PATENTS

| 195,864 | Austria | Feb. 25, 1958 |
| 816,912 | Great Britain | July 22, 1959 |